May 7, 1968  J. P. CONNER  3,382,469
ELECTRIC CONTROL DEVICE AND SUPPLEMENTAL POLE UNIT
Filed Nov. 22, 1965  6 Sheets-Sheet 5

United States Patent Office 3,382,469
Patented May 7, 1968

3,382,469
ELECTRIC CONTROL DEVICE AND SUPPLEMENTAL POLE UNIT
John P. Conner, Brighton Township, Beaver, Pa., assignor to Westinghouse Electric Corporation, Pittsburgh, Pa., a corporation of Pennsylvania
Filed Nov. 22, 1965, Ser. No. 508,900
9 Claims. (Cl. 335—161)

ABSTRACT OF THE DISCLOSURE

An improved control structure comprises an electromagnetic control device and a supplemental pole unit removably connected to the control device for operation by the control device. The supplemental pole unit comprises a movable bridging contact structure and a pivotally supported operating member for moving the bridging contact structure in a direction normal to the direction of movement of the actuator of the control device.

---

In order to provide the industrial market with less expensive installations that take up less plant space without sacrificing power ratings, efficiency or utility, engineers in the electric control art often devote a considerable amount of time and effort developing compactly constructed control structures. These compact control structures are not only less expensive to manufacture; but they also save space in panelboards. Thus, panelboard and control panel builders can manufacture and assemble smaller and less expensive installations for the industrial market.

Accordingly, an object of this invention is to provide an improved compactly constructed electric control structure.

Another object of this invention is to provide an improved control structure comprising an electric control device and an improved supplemental contact device removably connected to the control device.

Another object of this invention is to provide an improved supplemental pole unit.

A further object of this invention is to provide an improved combination comprising an electric control device and one or more supplemental pole units that can be removably connected to the control device without substantially increasing the panel space occupied by the control device.

A general object of this invention is to provide an improved electric control structure that is relatively easy to assemble and inexpensive to manufacture.

The invention, both as to structure and operation, together with additional objects and advantages thereof, will be best understood from the following detailed description when read in conjunction with the accompanying drawings.

In said drawings:

FIG. 7 is a sectional view of the control device taken generally along the line VII—VII of FIG. 6.

FIG. 8 is a sectional view of one of the supplemental pole units of FIG. 7, on an enlarged scale relative to FIG. 7, taken generally along the line VIII—VIII. FIG. 8 also includes part of the contact carrier of FIG. 4;

Figures 1, 10:
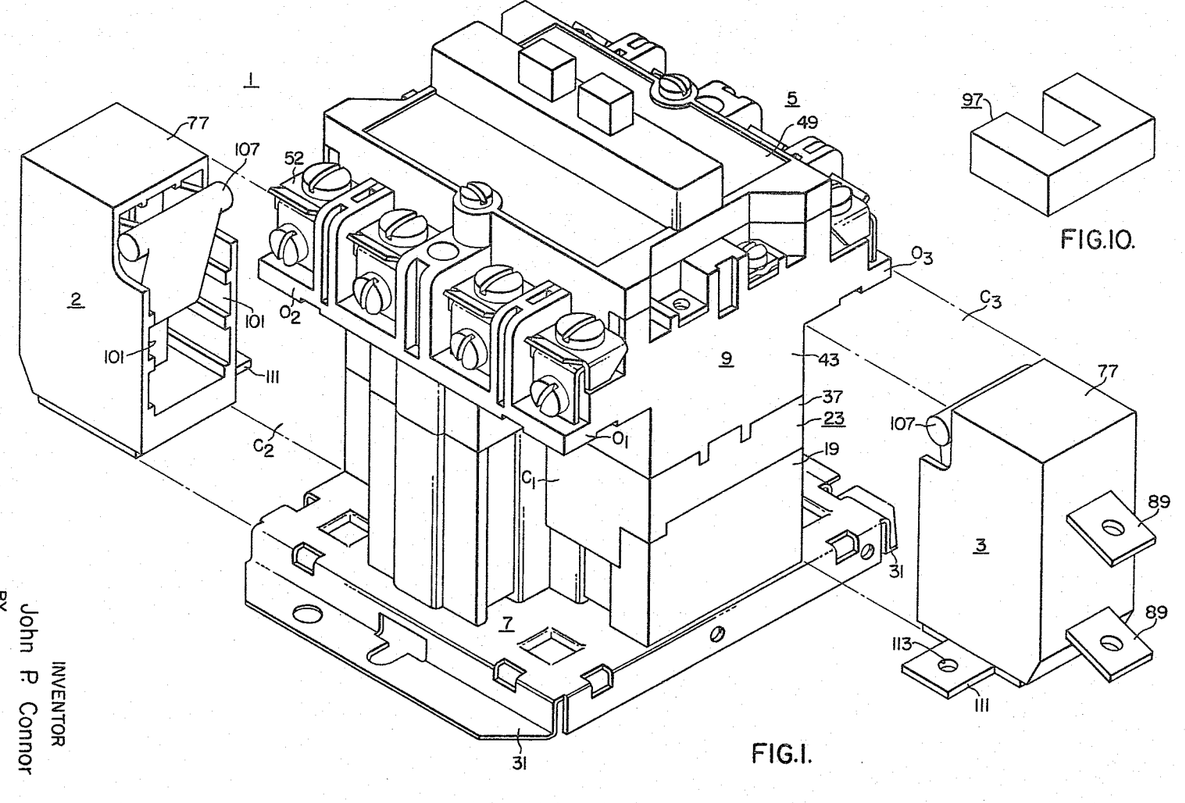
FIGURE 1 is an exploded isometric view, with parts broken away, of an electric control structure constructed in accordance with principles of this invention.
FIG. 10 is an isometric view of an insulating member shown in FIGS. 8 and 9.

Referring to the drawings, there is shown in FIG. 1 an electric control structure 1 comprising two supplemental contact devices 2 and 3 and an electric control device or contactor 5. The contactor 5 comprises a metallic base plate 7 and a contactor structure 9. The contactor 5 is a contactor of the type that is more specifically described in the copending patent application of John P. Conner et al., Ser. No. 369,715, filed May 25, 1964, now Patent No. 3,296,567.

Figure 2A:
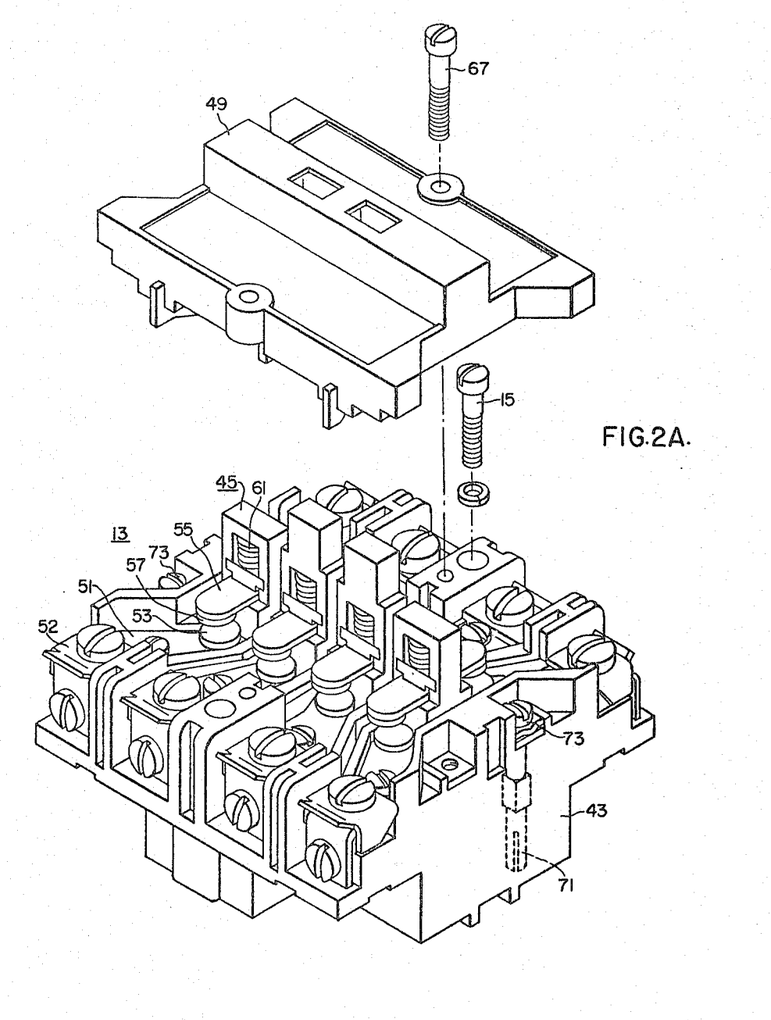
FIG. 2A is an exploded isometric view of the front part of the control device seen in FIG. 1.

The contactor structure 9 comprises a back part 11 (FIG. 2B) and a front part 13 (FIG. 2A) which parts are connected together by means of two screws 15 (only one screw 15 being shown in FIG. 2A). The contactor structure 9 is secured to the metallic base plate 7 by means of two screws 17 (only one screw 17 being shown in FIG. 2B).

Figure 2B:
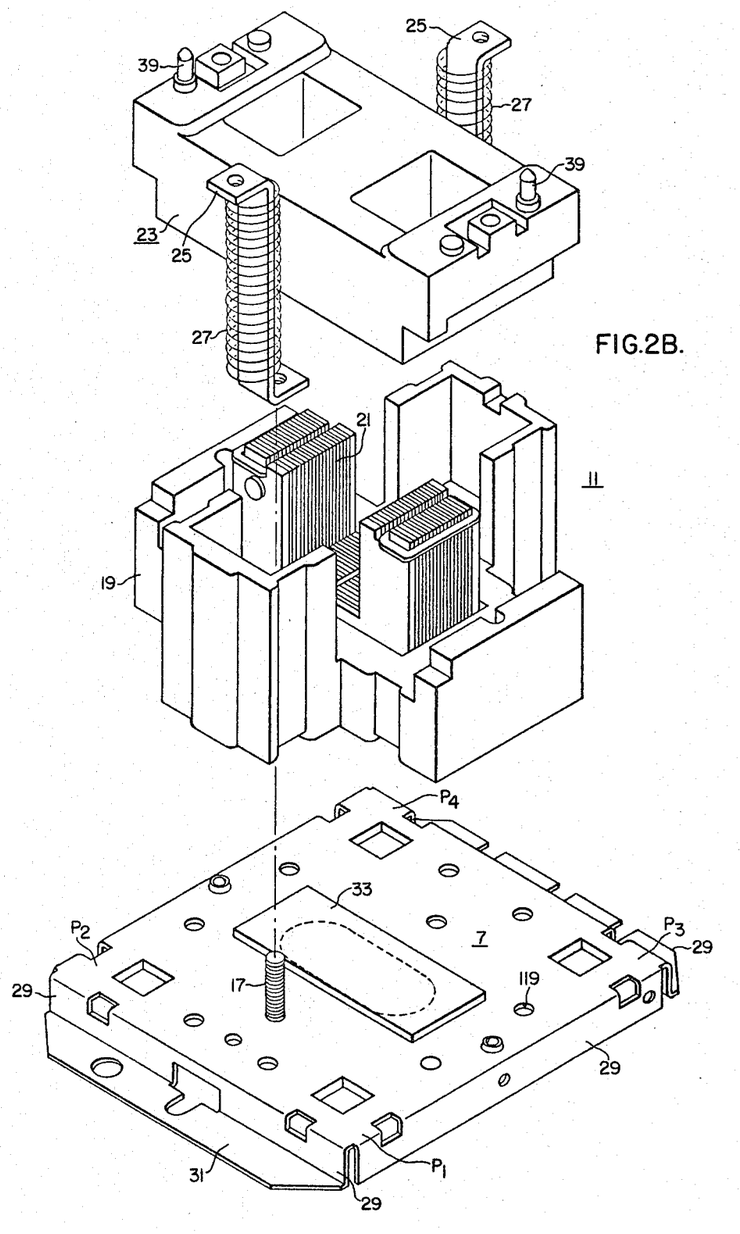
FIG. 2B is an exploded isometric view of the back part of the control device seen in FIG. 1.
Figure 6:
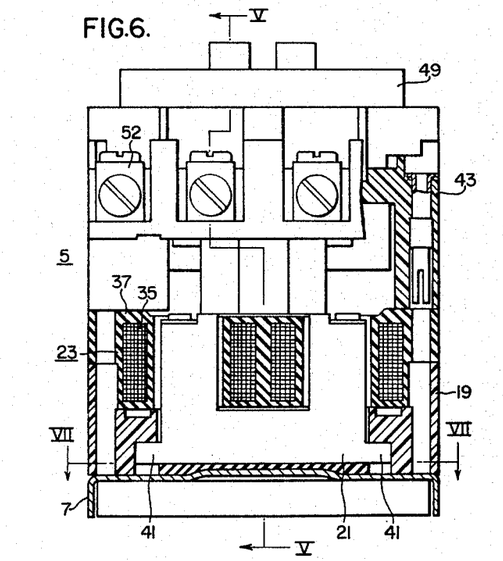
FIG. 6 is a sectional view taken generally along the line VI—VI of FIG. 5.
Figure 7:
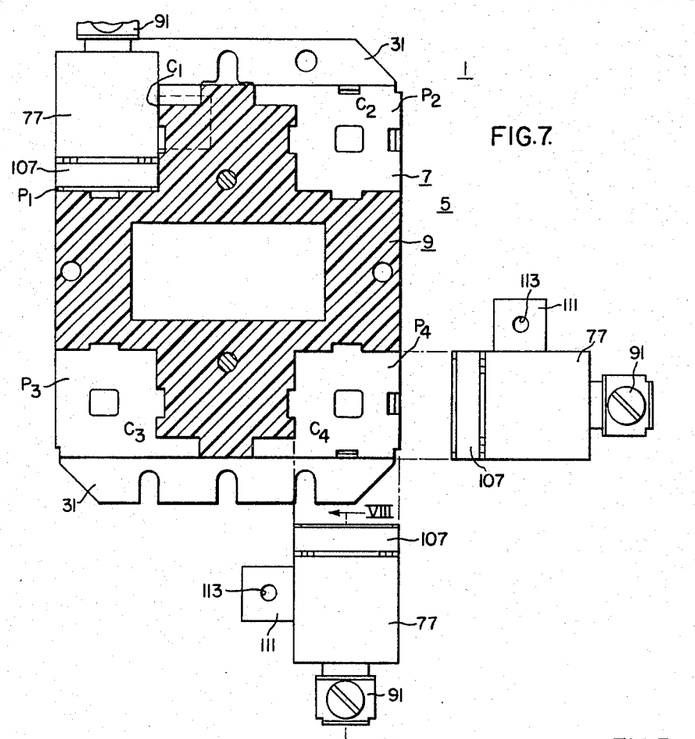
FIG. 7 also includes one supplemental pole unit, with parts broken away, in top plan view in a connected position on the control device, and two supplemental pole units in top plan view in extended positions from which extended positions either of the two supplemental pole units can be moved into a connected position on the control device.

As can be seen in FIG. 2B, the back part 11 of the contactor structure 9 comprises a back insulating housing part 19, a generally U-shaped magnetic core member 21, a coil structure 23, two generally Z-shaped supports 25 and two spring members 27 disposed over the supports 25. The mounting plate 7 comprises a sheet metal plate member bent over at the four sides thereof to form four leg portions 29, two of which leg portions are bent over to form flat flange parts 31 (FIGS. 2B and 7). A shock-absorbing elastomeric or rubber member 33 (FIG. 2B) is supported on the plate 7 below the core member 21. The coil structure 23 comprises a conducting coil 35 (FIGS. 5 and 6) encapsulated in an insulating shell 37. Two stab type terminals 39 (FIG. 2B) extend from the insulating shell 37 to enable connection of the coil in an electric circuit. As can be seen in FIG. 2B, the coil structure 23 has two openings therein which receive two legs of the generally U-shaped magnetic core member 21. The core member 21 is provided with two extensions 41 (FIG. 6) that are disposed under suitable ledges on the insulating housing part 19 to maintain the coil in place. The screws 17 (FIG. 2B), which pass through the mounting plate 7 and supports 25, draw the supports 25 and insulating housing part 19 toward the plate 7 capturing the coil 23 between the housing part 19 and the plate 7.

Figure 3:
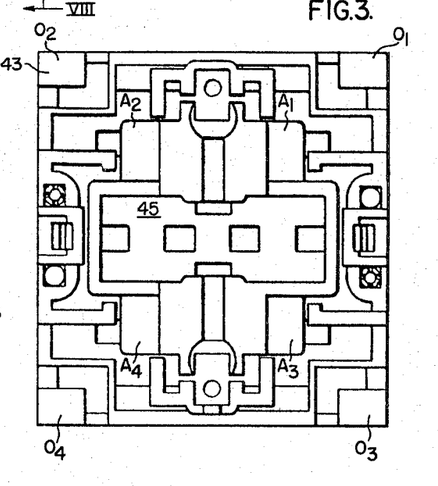
FIG. 3 is a bottom plan view of the front part (the part seen in FIG. 2A) of the control device of FIG. 1.
Figure 4:
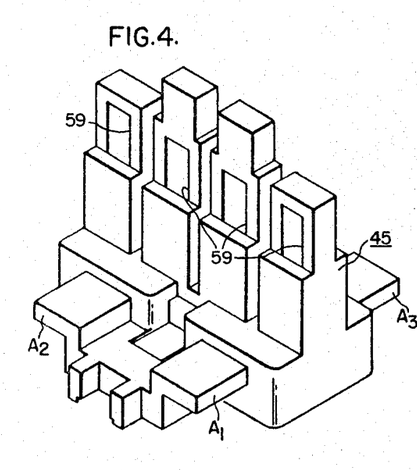
FIG. 4 is an isometric view of the insulating contact carrier or actuating member seen in FIGS. 2A and 3.
Figure 5:
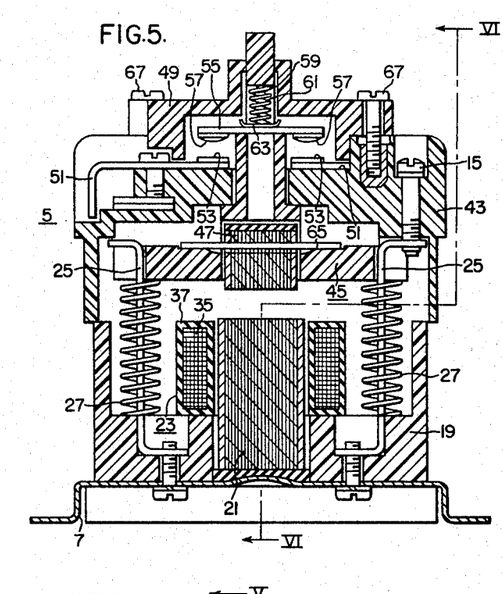
FIG. 5 is a sectional view taken generally along the line V—V of FIG. 6.

Referring to FIGS. 1, 2A, 3 and 4, the top or front part 13 of the contactor structure 9 comprises an upper housing part 43 of molded insulating material, a molded insulating actuating member or contact carrier 45, a generally U-shaped magnetic armature 47 (FIG. 5) and an insulating arc-hood device 49. The generally U-shaped armature 47 is positioned with the opposite leg portions thereof opposite the legs of the core member 21. As is best seen in FIGS. 2A and 5, four pairs of conducting straps 51 are suitably secured to the insulating housing part 43. A solderless terminal connector 52 is connected to the external end of each of the conductors 51 (FIGS. 1 and 6). A stationary contact 53 (FIGS. 2A and 5) is brazed or otherwise suitably secured to the inner end of each of the conductors 51. A separate bridging contact member 55, having a contact 57 at each of the opposite ends thereof, is provided to bridge each pair of separated stationary contacts 53. As is best seen in FIGS. 2A and 4, the insulating contact carrier has four window openings 59 therein. Each of the bridging contact members 55 is supported on the contact carrier or actuator 45 in a separate one of the window openings 59. In each of the openings 59 a separate compression spring 61 (FIGS. 2A and 5) biases a spring support 63 (FIG. 5) against the associated bridging contact member 55 to retain the member 55 in place and to provide for resilient contact engagement and contact pressure. As can be seen in FIG. 5, the insulating contact carrier 45 has an opening therein, and the armature 47 is supported on the contact carrier in the opening by means of a supporting pin 65 that passes through a suitable opening in the armature 57 and is supported on a ledge surface of the insulating contact carrier 45. During assembly of the upper or front part 13 (FIG. 2A), the insulating contact carrier 45 and armature 47 are moved up through an opening from the bottom of the insulating housing part 43 and, thereafter, the bridging contact members 55 are placed in position in the window openings of the contact carrier 45 to thereby secure the insulating contact carrier 45 and armature 47 along with the bridging contact members 55 in position on the upper housing part 43. The arc-hood device 49 is a molded insulating member having four arc chambers formed therein to extinguish the arcs drawn between the separating contacts of the four pole units of the contactor 9. Although only one of the pole units is specifically described with reference to FIG. 5, it can be understood that all of the pole units are constructed in the same manner to be simultaneously operated by operation of the electromagnet 21, 47. The arc-hood device 49 is secured to the upper housing part 43 by means of two screws 67 (FIGS. 2A and 5). The front or upper part 13 (FIG. 2A) is secured to the back or lower part 11 (FIG. 2B) by means of the two screws 15 (only one of which is shown in FIGS. 2A and 5). Each of the screws 15 is threaded into an upper tapped opening in a different one of the two supports 25. The two springs 27 (FIG. 5) engage the contact carrier 45 to bias the contact carrier 45, armature 47 and bridging contact members 55 to the upper unattracted position seen in FIG. 5. Suitable electric socket members 71 (one of which is shown in FIG. 2A) are positioned to receive the stab connectors 39 (FIG. 2B) of the coil 23. A separate external terminal connector 73 (FIG. 2B) is provided to enable connection of the coil 35 in an electric circuit through the stabs 39 and sockets 71. The terminal connectors 73 are externally accessible.

Referring to FIG. 5, the contactor 9 is shown therein with the contact carrier 45 and armature 47 biased to the upper unattracted position by means of the springs 27. When the contact carrier 45 is in this position, the four bridging contact members 55 are in the upper position with the movable contacts 57 separated from the stationary contacts 53. Thus, the four poles of the contactor are normally opened. It can be understood that the contactor can be constructed with more or less than four poles and that the poles can be constructed to provide either normally open or normally closed operation in a manner well known in the art. Upon energization of the coil 35, the armature 47 is attracted, against the bias of the springs 27, into engagement with the core 21. This movement is limited by engagement of the pole faces of the armature with the pole faces of the core member 21. During this movement, the springs 27 are charged and the four bridging contact members 55 are moved down, moving the contacts 57 into engagement with the contacts 53 whereby each of the bridging contact members 55 closes the circuit between the associated stationary contacts 53. Each of the springs 61 is compressed slightly during the closing operation to provide contact pressure between the closed contacts. With the armature 47 in engagement with the core 21, and with the contact carrier 45 in the lower position, when the coil 35 is deenergized the charged springs 27 will expand moving the insulating contact carrier 45 upward to the position seen in FIG. 5 during which movement the insulating contact carrier 45, armature 47 and the four bridging contact members 55 are moved upward to the unattracted position. The upward movement is limited by engagement of suitable parts of the insulating carrier 45 with stop means on the insulating housing part 43. The insulating contact carrier 45 is shaped to fit in suitable openings in the housing part 43 in such a manner that the contact carrier 45 is guided in the openings for generally rectilinear vertical (FIGS. 5 and 6) movement between the opened and closed positions.

Figure 8:
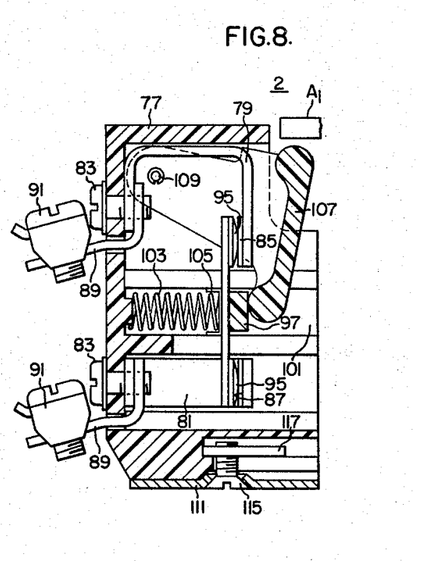
Figure 9:
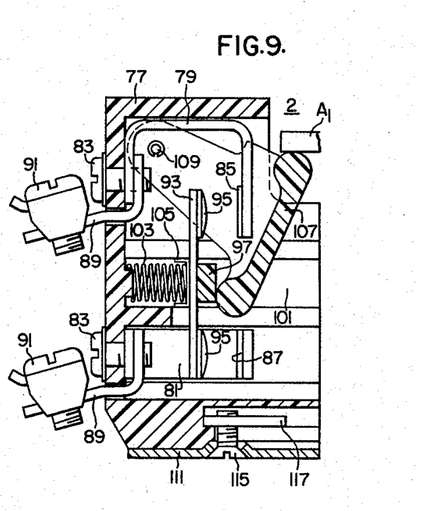
FIG. 9 is a view similar to FIG. 8, with the supplemental pole unit and the part of the contact carrier being shown in the actuated position.

Referring to FIGS. 1, and 7–10, only the one supplemental contact device 2 will be herein specifically described, it being understood that the description applies to both of the supplemental contact devices 2 and 3 as seen in FIG. 1. Referring to FIGS. 1 and 7–9, the supplemental contact device 2 comprises a planar front, a planar back and sidewall means comprising three planar sidewalls extending vertically from front to back normal to the planes of the planar front and planar back. As can be seen in FIGS. 1, 8 and 9, one side of the control device is open. Referring to FIGS. 1, 8 and 9, the supplemental contact device 2 comprises an insulating housing 77. Two rigid stationary conducting members 79 and 81 are supported in the housing 77. Each of the conductors 79 and 81 is a generally U-shaped member and is secured in place by means of a separate bolt 83 that passes through one leg of the conductor. A stationary contact 85 is secured to the free end of the conductor 79 and a stationary contact 87 is secured to the free end of the conductor 81. The bolts 83 also secure two terminal conductors 89 to the conductors 79, 81 and a separate solderless terminal connector 91 is secured to the external end of each of the terminal conductors 89. As can be seen in FIGS. 8 and 9, the terminal conductors 89 extend out through suitable openings in the housing 77. As can be seen in FIGS. 8 and 9, the legs of the upper conductor 79 extend downward along the plane of the paper and the legs of the lower conductor 81 extend outward generally in the direction normal to the plane of the paper as seen in these figures. A conducting bridging contact member 93, having a separate movable contact 95 at each of the two oppoite ends thereof, is supported in the housing 77 to cooperate with the stationary contacts 85, 87. A U-shaped insulating contact carrier 97 (FIGS. 8, 9 and 10) is supported in the housing 77 for generally rectilinear movement. The opposite legs of the U-shaped contact carrier 97 are captured in tracks 101 formed in the opposite side walls of the housing 77. As can be seen in FIGS. 1, 8 and 9, the tracks 101 are formed as generally straight elongated notches that are elongated to provide rectilinear movement of the contact carrier 97. A compression spring 103 fits between an end wall of the housing 77 and a spring support 105 that is disposed between the opposite legs of the U-shaped contact carrier 97. The support 105 abuts against the bridging contact member 93. The spring 103 holds the bridging contact member 93 in place and biases the bridging contact member 93 and contact carrier 97 to the closed-contact position seen in FIG. 8. An insulating operating member 107 is pivotally supported in the housing 77 on a pivot pin 109. A metallic housing plate 111, having a tapped opening 113 (FIGS. 1 and 7) therein, is supported on the back part of the housing 77 by means of a bolt 115 (FIGS. 8 and 9) that passes through an opening in the plate 111 and threads into a nut 117 that is disposed in a suitable slot in the insulating housing 77. The bolt 115 may be loosened, whereupon the plate 111 can be rotated 180°. Thus, the plate 111 can protrude out from either of the two opposite sides of the housing 77. The tapped opening 113 is positioned such that when the supplemental contact device 2 is mounted on the mounting plate 7 the opening 113 will be aligned with one of eight openings 119 (FIG. 2B) in the mounting plate 7 whereby a bolt can be passed up through the bottom of the mounting plate and threaded into the tapped opening 113 to secure the supplemental contact device to the mounting plate 7.

The supplemental contact device 2 is shown in FIG. 8 in the closed position. During operation, when the operator 107 is pivoted in a clockwise (FIG. 8) direction about the pivot 109, this movement, because of the engagement of the operator 107 with the member 97, will move the member 97 and bridging contact member 93 against the bias of the spring 103 to the open position seen in FIG. 9. When the operating member 107 is released, the spring 103 will discharge biasing the bridging contact member 93 and member 97 back to the closed position seen in FIG. 8. Durring this movement the bridging contact member 93 and the member 97 are guided for generally rectilinear movement by the engagement of the opposite legs of the U-shaped member 97 in the tracks 101 that are formed on the opposite side walls of the insulating housing 77. Although the supplemental contact device is disclosed as a normally closed device that is operated to the open position, it can be understood that the arrangement of the stationary contacts 87 and movable contacts 95 can be such that the position of the bridging contact member 93 in FIG. 8 will be a normally open position and when the bridging contact member 93 is operated to the position seen in FIG. 9 the contacts will engage stationary contacts in a closed position. Thus, the supplemental contact device can be constructed to operate as a normally open contact device. In operation, conducting lines are connected to the solderless terminal connectors 91 and the bridging contact member 93 operates to open and close a circuit from the conducting lines through the conductors 89, the conductors 79, 81, the stationary contacts 85, 87, the movable contacts 95, and the bridging contact member 93.

Referring to FIG. 1, it will be noted that the insulating housing part 19, the insulating cover 37 of the coil structure 23 and the insulating housing part 43 all mate and cooperate, along with the insulating arc-hood device 49, to form the insulating housing structure of the contactor structure 9. The insulating parts 19, 37 and 43 are formed to provide four cavities; one cavity at each of the back four corners of the contactor. The cavities are identified as $C_1$, $C_2$, $C_3$ and $C_4$. The cavity $C_4$, which cannot be seen in FIG. 1 is seen in FIG. 7. Each of the four cavities is either identical or symmetrically identical to each of the three other of the four cavities. The insulating housing part 43 overhangs the four cavities $C_1$ $C_2$, $C_3$ and $C_4$ at the four corners $O_1$, $O_2$, $O_3$ and $O_4$ thereof (FIGS. 1 and 3) respectively. The four corners $P_1$ $P_2$, $P_3$ and $P_4$ (FIGS. 2B and 7) of the mounting plate 7 serve as the four bases of the cavities $C_1$, $C_2$, $C_3$ and $C_4$ respectively. As can be seen in FIG. 7, the supplemental contact device in the upper left-hand corner is mounted on the mounting plate 7 in the cavity $C_1$, and two supplemental contact devices are shown outside of the cavity $C_4$ with dot-and-dash lines drawn into the cavity $C_4$ in order to indicate that either of these supplemental contact devices could be mounted in the cavity $C_4$ by means of a rectilinear movement into the mounted position. Thus, it is to be noted that the supplemental contact device can be mounted in any of the four cavities of the control device in either of the two positions indicated at the cavity $C_4$ in FIG. 7. When the supplemental control device is moved into the mounted position, the mounting plate 111 thereof protrudes into an opening between the housing part 19 and in the mounting plate 7 and the opening 113 is aligned with one of the eight openings 119 (FIG. 2B) in the mounting plate 7. A screw may be then passed up through the opening in the mounting plate 7 and threaded into the tapped opening 113 to secure the supplemental contact device in the mounted position. If it is desired to move the supplemental contact device into the cavity from the other side of the cavity, the screw 115 is loosened and the plate 111 is rotated 180° and the screw 115 is tighened to secure the plate 111 in a position protruding out from the opposite side of the supplemental contact device. The opening 113 will then be aligned with another of the openings 119 in the mounting plate 7 for receiving a bolt that is used to connect the supplemental contact device to the mounting plate 7.

Referring to FIGS. 3 and 4, it will be noted that the actuating member or insulating contact carrier 45 is provided with four actuating parts or corners $A_1$, $A_2$, $A_3$ and $A_4$ molded as integral insulating parts of the insulating contact carrier. Each of the four corners $A_1$, $A_2$, $A_3$ and $A_4$ serves as an actuating part moving rectilinearly in the associated cavity in a vertical (FIGS. 5 and 6) direction with the integral insulating contact carrier 45 to thereby engage and actuate the operating member 107 of a supplemental contact device 2, 3 if the supplemental contact device is disposed in the cavity. The operating member 107 (FIG. 1) of the supplemental contact device extends across the width of the supplemental contact device so that the operating member 107 will be engaged by one of the actuating corners of the contact carrier in either of the two alternate mounted positions indicated with reference to the cavity $C_4$ in FIG. 7. With the supplemental contact device in the cavity, the terminals 91 (FIGS. 7–9) are accessible to enable connection of the associated contacts in an electric circuit.

Figure 11:
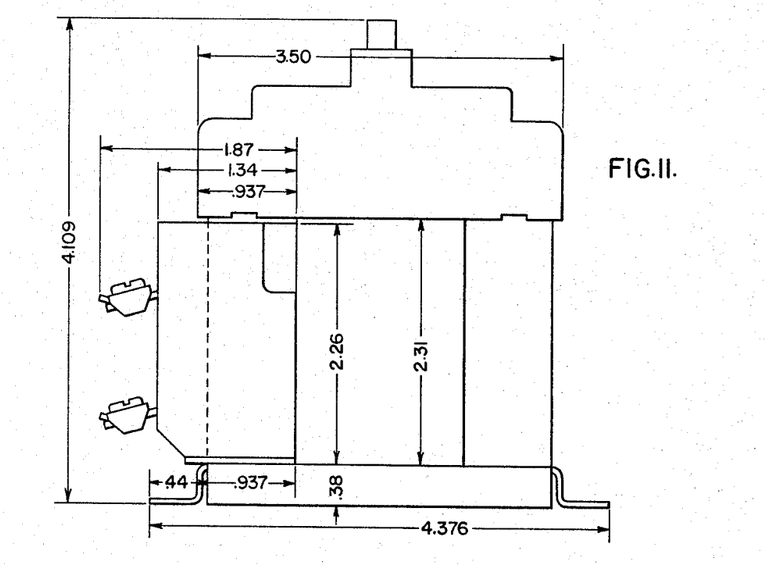
FIGS. 11 and 12 are outline views for illustrating dimensions of parts of a control structure constructed in accordance with principles of this invention.
Figure 12:
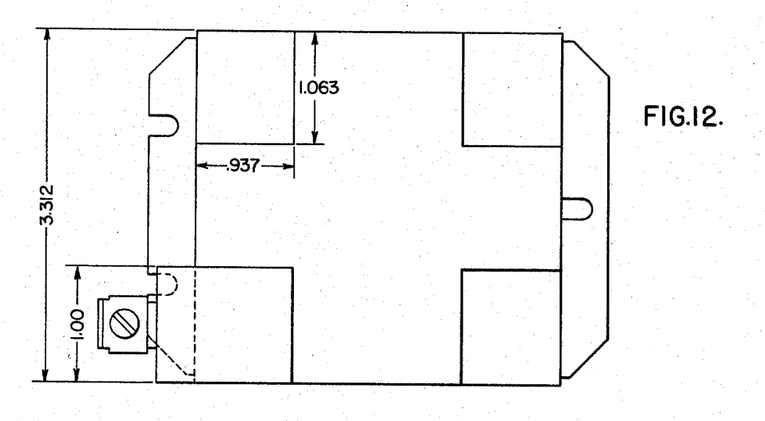

As can be seen in FIGS. 7, 11 and 12, when the supplemental contact device is mounted in any of the cavities the supplemental contact device extends past the outside dimensions of the contactor structure part 9 of the control device 5 in only one direction (FIG. 11), and only the solderless terminals 91 extend past the top plan view dimensions of the mounting plate in this one direction. Thus, it can be understood that the supplemental contact device does not take up substantial additional panel space in a panelboard or control center. It is to be understood that a plurality of the control structures can be mounted in generally parallel spaced rows in a substantially abutting side-by-side relationship and only the solderless terminals of the supplemental contact devices will extend past the top plan view dimensions of the control devices 5 into the space between the rows. Most of the volume of the main body portion of each of the supplemental contact devices fits within the confines of the associated cavity of the insulating housing part of the contactor structure 9.

It is to be noted that the operating member 107 of the supplemental contact device is automatically operatively connected to the contact carrier 45 of the contactor mearly by means of the mounting operation which mounting operation positions the member 107 below one of the corners or actuating parts of the contact carrier. When the supplemental contact device is mounted in position and the contactor is actuated in the same manner hereinbefore described, the associated actuating part or corner of the insulating contact carrier 45 will be moved downward to engage the operating member 107 (FIGS. 8 and 9) to pivot the operating member 107 from the FIG. 8 to the FIG. 9 position to open the contacts of the supplemental contact device. When the contactor coil is deenergized and the insulating contact carrier 45 is moved upward to the position seen in FIG. 5, the contact carrier will move away from the operating member 107 whereupon the spring 103 (FIGS. 8 and 9) will move the bridging contact member 93, the member 97 and operating member 107 back to the position seen in FIG. 8 to again close the contacts of the supplemental contact device. One of the actuating parts or corners $A_1$ is partially shown in FIGS. 8 and 9 to indicate the cooperation between the contact carrier of the contactor and the operating member 107 of the supplemental contact device.

Electrical rating of a control device, such as a contactor, is defined as the ability to conduct a specified steady state value of current without exceeding a predetermined temperature level. The electrical rating is also defined as the ability to make and break an electric circuit, in which the momentary values of current may reach, for example, as high as ten times the steady state values, for a specified number of times such, for example, as a million times. The electrical rating is a direct function of such physical parameters as contact diameter, contact volume and contact material; the material and volume of the bridging contact member; the type of backing material; the contact pressure in a closed position; the number of contact breaks per pole; the type of arcing chamber; and the length of contact gap in the open position. The particular contactor herein disclosed is designed such that the four main pole units thereof are rated at either 18 amps continuous, with up to three horsepower capacity at 440/600 volts single phase, or 27 amps continuous, with up to 5 horsepower capacity at 440/600 volts single phase; which selection is made depending upon the choice of current carrying parts. Therein disclosed supplemental control devices are constructed with the required physical parameters to provide the same electrical rating as the four main pole units of the contactor. Thus, the supplemental contact devices serve as supplemental pole units that can be removably connected to the control device when control of additional pole units is desired. Each supplemental pole unit can be mounted in either of the four cavities of the control device in either of the two alternate positions indicated and described with reference to the cavity $C_4$ in FIG. 7. For certain applications, as many as four supplemental pole units could be used to provide four additional pole units controlled by the contactor. As a practical matter, with the terminals of the supplemental control devices extending slightly into the spaces between spaced rows of substantially abutting control structures, which spaces serve as wiring channels whereby the terminals are accessible for wiring in the wiring channels, the supplemental control devices can be mounted in position without necessitating an increase in panel space over the amount of panel space that would normally otherwise be utilized merely by the rows of control devices themselves.

Since numerous changes may be made in the above-described construction, and because different embodiments of the invention may be made without departing from the spirit and scope of the invention, it is intended that all matter contained in the foregoing description or shown in the accompanying drawings be interpreted as illustrative and not in a limiting sense.

I claim as my invention:

1. In combination, an electric control device comprising a first insulating housing, a control mechanism supported generally within said first insulating housing, said control mechanism comprising a main pole unit having a predetermined first electrical rating, said main pole unit comprising a first pair of contact structures constructed to control the circuit of said main pole unit, said first pair of contact structures being operable between opened and closed operating positions, said control mechanism comprising an electromagnet and a movable member, said electromagnet being operable between an energized and a deenergized condition, upon operation of said electromagnet from one to the other of said conditions said movable member moving to operate said contacts from one to the other of said operating positions, a supplemental pole unit having an electrical rating as high as said first electrical rating, said supplemental pole unit comprising a second insulating housing and a second pair of contact structures disposed generally within said second insulating housing, said second pair of contact structures being constructed to control the circuit of said supplemental pole unit, said supplemental pole unit comprising an operating member movable to operate said second pair of contact structures between opened and closed operating positions, said first insulating housing being shaped to form a pole-unit-receiving cavity, said supplemental pole unit being removably connected to said control device in a position extending into said pole-unit-receiving cavity with said operating member in the path of movement of said movable member whereby said movement of said movable member will move said operating member to operate said second pair of contact structures from one to the other of said operating positions.

2. The combination according to claim 1, said control device comprising a plurality of said pole-unit-receiving cavities, said movable member moving in proximity to each of said plurality of pole-unit-receiving cavities, and said supplemental pole unit being removably connectable to said control device at each of said plurality of pole-unit-receiving cavities extending into the pole-unit-receiving cavity with said operating member in the path of movement of said movable member whereby said movement of said movable member will move said operating member to operate said second pair of contact structures from one to the other of said operating positions.

3. The combination of claim 1, wherein: more than half of the volume of space occupied by said supplemental pole unit is disposed within the confines of said cavity.

4. The combination according to claim 1, said electric control device comprising a front and a back, said movable member comprising a contact carrier supported for generally rectilinearly movement in the direction from from to back and back to front upon alternate energizing and deenergizing operations of said electromagnet, said first pair of contact structures being disposed at the front side of said contact carrier and comprising a first movable contact member connected to said contact carrier for generally rectilinear operative movement with said contact carrier in the same direction as said generally rectilinear movement of said contact carrier, said first insulating housing being shaped to form four of said pole-unit-receiving cavities positioned generally at the four corners of an imaginary rectangle at the back part of said control device, said insulating contact carrier comprising four actuating portions each of which is disposed on the front side of a different one of each of said four cavities, said second pair of contact structures comprising a second movable contract member operatively movable generally rectilinearly in a direction generally normal to the generally rectilinear movement of said contact carrier, when said contact carrier is moved to operatively move said first movable contact member one of said four actuating portions engaging said operating member to move said operating member to operatively move said second movable contact member, and said supplemental pole unit being removably mountable in each of said four pole-unit-receiving cavities such that when said contact carrier is moved to operatively move said first movable contact member the associated one of said four actuating portions will engage said operating member to move said operating member to operatively move said second movable contact member.

5. In combination, an electric control device comprising a first insulating housing, a control mechanism supported generally within said first insulating housing, said control mechanism comprising an electromagnet, a movable actuator connected for operative movement upon operation of said electromagnet, a first pair of contact structures comprising a first stationary contact structure and a first movable contact structure, said first movable contact structure being supported for operative generally rectilinear movement between opened and closed positions upon operative movement of said actuator, said electromagnet being operable between an energized condition and a deenergized condition, upon operation of said electromagnet from one to the other of said conditions said actuator moving to move said first movable contact structure generally rectilinearly from one to the other of said positions, a supplemental contact device comprising a second insulating housing, a second pair of contact structures supported generally within said second insulating housing, said second pair of contact structures comprising a second stationary contact structure and a second movable contact structure which second movable contact structure is supported for generally rectilinear movement between opened and closed positions, an operating member supported on said second insulating housing for operating said second movable contact structure, said supplemental pole unit being removably connected to said electric control device with said operating member in the path of movement of said actuator whereby upon said operation of said electromagnet said actuator will move to operatively move said operating member to operate said second movable contact structure from one to the other of said opened and closed positions, and said second movable contact structure moving in a direction generally normal to the direction of movement of said first movable contact structure.

6. The combination according to claim 5, said control device comprising a front and a back, and said movement of said actuator and said first movable contact structure being a generally rectilinearly movement in the direction from front to back of said control device, said first pair of contact structures being positioned at the front side of said actuator, and said supplemental contact device being positioned at the back side of said actuator.

7. The combination of claim 6, said first stationary contact structure comprises a pair of spaced first stationary contacts spaced in a first direction, said first movable contact structure comprises a bridging contact member comprising an elongated member having a pair of contacts disposed at the opposite ends thereof for cooperation with said pair of spaced first stationary contact structures, said first bridging contact member being elongated in a direction generally normal to the direction of movement of said actuator and said first movable contact structure, said second stationary contact structure comprising a pair of spaced second stationary contacts spaced in the direction of movement of said actuator, said second movable contact structure comprising a bridging contact structure comprising an elongated member with a pair of spaced contacts at opposite ends thereof for cooperation with said pair of spaced second stationary contacts, said second bridging contact member being elongated in the direction of movement of said actuator.

8. A contact device comprising an insulating housing, said housing comprising a front, a back and vertical sidewall means between said front and back, a pair of stationary contacts supported within said housing in a vertically spaced relationship along a line generally parallel to said sidewall means, said sidewall means having opening means therein, a pair of terminal conductors extending through said opening means and being positioned externally of said housing in a vertically spaced relationship along a line generally parallel to said sidewall means, a separate terminal means connected to the external part of each of said terminal conductors, each of said terminal conductors being electrically connected to a different one of said stationary contacts, a bridging contact structure supported in said housing for horizonal generally rectilinear movement into and out of engagement with said stationary contacts, and an operating member pivotally supported on said housing and accessible for operation by an external actuator moving in the direction from front to back during which movement said operating member pivots to operate said bridging contact structure.

9. A contact device according to claim 8, spring means in said housing biasing said bridging contact member into a first operating position, said operating member being pivotally movable by said actuator from a first position to a second position to operate said bridging contact member from a first position to a second position against the bias of said spring means, and upon release of said operating member by said actuator, said spring means operating to operate said bridging contact member and operating member from said second position to said first position.

References Cited
UNITED STATES PATENTS

| | | | |
|---|---|---|---|
| 2,399,575 | 4/1946 | Schleicher | 335—131 |
| 3,226,516 | 12/1965 | Kussy et al. | 335—132 |
| 3,296,567 | 1/1967 | Corner et al. | 335—132 |

BERNARD A. GILHEANY, *Primary Examiner.*

R. N. ENVALL, JR., *Assistant Examiner.*